Sept. 2, 1969　　　　　　J. P. PRESSAU　　　　　3,464,807
METHOD FOR PRODUCING SURFACE COMPRESSION IN CERTAIN
GLASSES BY PROMOTING RANDOM SURFACE CRYSTALLIZATION
Filed March 8, 1968　　　　　　　　　　　　　3 Sheets-Sheet 1

GLASS　　　　GLASS INTERIOR
SURFACE

RANDOM SURFACE AND NEAR SURFACE NUCLEATED CRYSTALLIZATION

INVENTOR.
JEAN PIERRE PRESSAU
BY
ATTORNEYS

UNIDIRECTIONAL SURFACE NUCLEATED CRYSTALLIZATION

----- SURFACE TEMPERATURE OF GLASS ARTICLE

——— CENTRAL TEMPERATURE OF GLASS ARTICLE 3,464,807
Patented Sept. 2, 1969

3,464,807
METHOD FOR PRODUCING SURFACE COMPRESSION IN CERTAIN GLASSES BY PROMOTING RANDOM SURFACE CRYSTALLIZATION
Jean P. Pressau, Evans City, Pa., assignor to PPG Industries, Inc., a corporation of Pennsylvania
Continuation-in-part of application Ser. No. 376,544, June 19, 1964. This application Mar. 8, 1968, Ser. No. 712,335
Int. Cl. C03b 27/00
U.S. Cl. 65—33                    10 Claims

ABSTRACT OF THE DISCLOSURE

This invention relates to the manufacture of strengthened glass articles. Strength improvement is realized through heat treatments which develop crystal nuclei throughout the glass article and then promote crystalline growth at and near the surface of the glass article. More particularly, this invention relates to a method of producing a strengthened glass article which comprises heating a crystallizable glass containing an internal nucleating agent to develop nucleation sites throughout the glass article, then increasing the temperature of the glass article in selected portions only to promote crystalline growth in only the selected portions. The invention especially relates to the development of randomly-oriented silica-O crystals in and near the surface portions only of the glass article.

Figure 1:
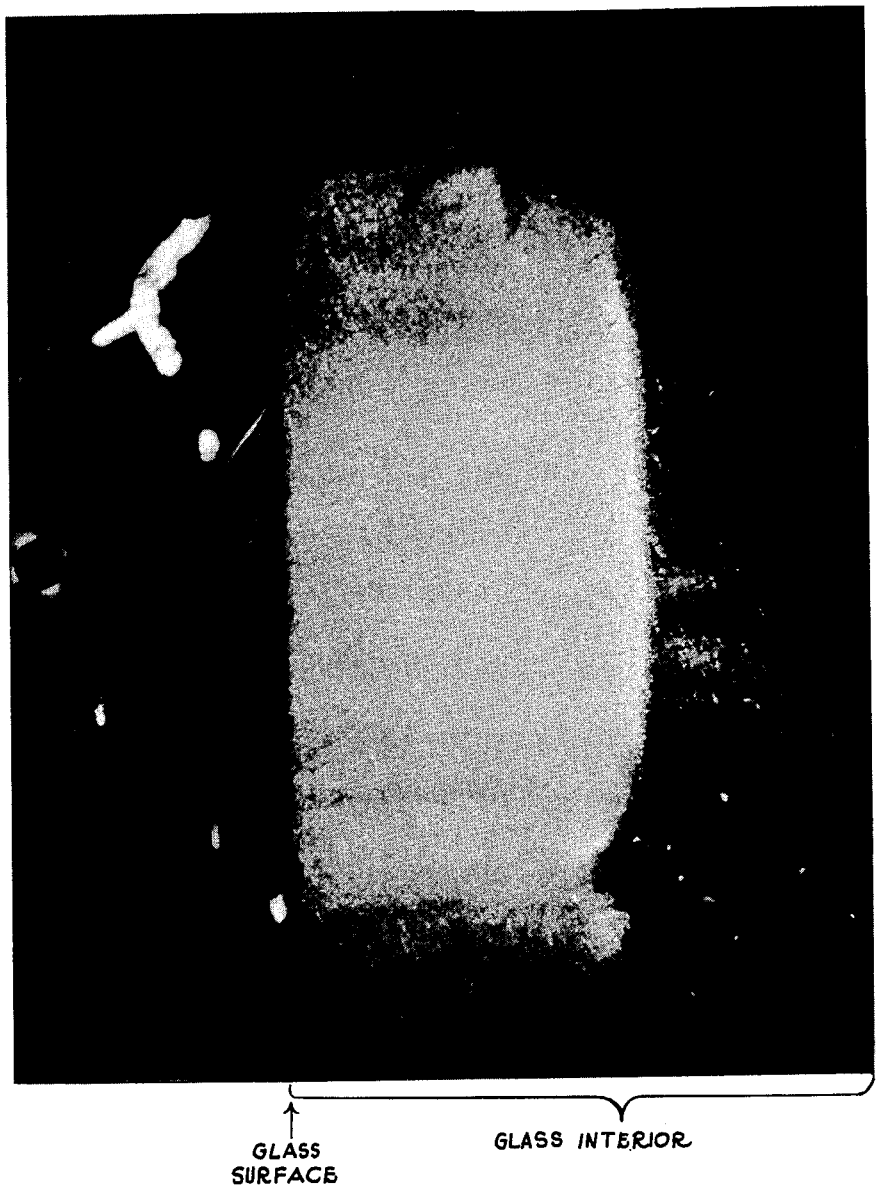

This application is a continuation-in-part of my copending application Ser. No. 376,544 filed June 19, 1964 now abandoned.

BACKGROUND

One method of increasing the strength of a glass article is by inducing a compressive stress in the surface of the glass article. The most common way to accomplish this is by thermal tempering (air quenching) of the glass article. This method comprises heating the glass body above its strain point and then rapidly cooling it to a temperature below the glass strain while avoiding devitrification. Thermally tempered glass articles normally have their modulus of rupture approximately doubled by this treatment, producing strengths of approximately 15,000 to 25,000 pounds per square inch.

The term "strain point" is defined by the American Society for Testing Materials as the temperature at which the glass has a viscosity of $10^{14.5}$ poises. The softening point is defined to occur at the temperature at which the glass has a viscosity of $10^{7.6}$ poises.

A permanent surface compression stress which cannot be removed by heating can be provided by the method known as casing which, as heretofore practiced, comprises covering an initial gather of one glass with a gather of another glass. The second glass is selected to have a lower thermal expansion coefficient than the first. When the double gather of glass is expanded by blowing and subsequently cooled, the inner portion having the higher thermal expansion coefficient tends to contract more than the surface layer, thereby producing a permanent surface compression stress. While this method is effective for the production of blown glass articles and to a lesser extent articles made by rolling and by drawing, it is not practicable for articles formed by gob feeding. The glass article so made possesses an inherent zone of weakness. Its tensile strength is variable and rarely exceeds the strength of tempered glass articles. The sharp boundary at the junction of the two glasses limits the maximum useful stress which can be maintained without exceeding the breaking strength of the joint.

Other methods of inducing compressive stress in the surfaces of glass articles are through ion exchange techniques. Ion exchange treatments are of two types. One method, disclosed by Hood et al. in U.S. Patent 2,779,136, consists of heating the glass article above the glass composiiton's strain point and then exchanging a smaller sized alkali metal ion for a larger sized alkali metal ion contained in the base glass composition. The replacement of the smaller ion for the larger ion in the surface of the glass results in a surface glass composition that has a lower coefficient of thermal expansion than the base glass. This differential in the coefficients of thermal expansion between the surface glass composition and the interior glass composition results in the glass surface being placed in a state of high compressive stress.

Another method of increasing the strength of a glass article through ion exchange techniques, disclosed in Corning Glass Works, Republic of South Africa, Patent 622,353, comprises heating a glass article to a temperature somewhat below the strain point of the glass and then placing the glass in contact with an alkali metal ion bath whose ion is larger than the alkali metal ion in the base glass composition. The larger ion from the alkali metal ion bath replaces the smaller alkali metal ion in the glass surface. This technique essentially consists of wedging a larger ion into the hole left in the glass structure by the removal of a smaller ion. Since this is accomplished below the relaxation (strain) point of the glass, the surface structure does not completely adjust itself to accommodate the larger sized ions which are being forced into it, and the surface develops a state of high compressive stress when cooled to room temperature.

Certain specific glass compositions have also been formulated which are able to produce crystals of β-spodumene ($Li_2O \cdot Al_2Al_3 \cdot 4SiO_2$) in the glass surface through ion exchange techniques. The development of this crystal in the glass further reduces the coefficient of thermal expansion of the surface of the glass, increasing the surface compressive stress realized, which, in turn, increases the overall strength exhibited by the glass article. This process is also disclosed in U.S. Patent No. 2,779,136.

Ion exchage techniques usually require the immersion of the glass article to be treated in a bath of a molten alkali-metal salt. Molten alkali-metal salt baths are both difficult to maintain and dangerous to control, which makes difficult their use in a commercial operation.

Crystallization to increase the strength of glass articles not in conjunction with ion exchange techniques has also been suggested. Belgian Patent 576,259 discloses the method of heat treating a lithia-alumina-silica base glass composition to produce crystallization in the glass. The method described results in crystallization throughout the entire thickness of the glassy matrix, converting the glass article into a complex of crystals and glass wherein the crystals are substantially uniformly dispersed in and throughout the entire glassy matrix. The increase in strength of the glass realized by this treatment is not in excess of the strength improvement realized by ordinary annealing and tempering operations commonly in commercial use for glass articles.

Another method of strengthening glass articles utilizing crystallization techniques involves the carefully controlled heat treatment over a long period of time of certain lithia-alumina-silica glasses which have the same composition as the β-eucryptite crystal ($Li_2O \cdot Al_2O_3 \cdot 2SiO_2$). These glass compositions may or may not also contain a certain amount of nucleating agent, such as $TiO_2$, distributed throughout the glass batch. The β-eucryptite crystal has a low coefficient of thermal expansion, and when present only in the surface of a glass article, places the surface in a state of high compressive stress when the glass article is cooled. This procedure is illustrated in U.S. Patent No. 2,998,675.

The known surface crystallization methods for increasing the strength of glass characteristically relates to crystalline growth which predominantly begins at the surface of the glass. The crystals grow inwardly from the surface to form long, needle-like crystals which are parallel to each other and which extend perpendicular to the surface in their long dimension.

The needle-shaped β-eucryptite crystals exhibit a different thermal coefficient of linear expansion along each of their three principal axes, the greatest negative expansion coefficient occurring along the C axis. The most desirable crystalline orientation with respect to the surface of the glass article therefore occurs when the C axis of the β-eucryptite crystal is parallel to the surface of the glass article. It is characteristic of the methods in which crystallization begins at the surface that the C axis of the crystals developed predominantly orients itself perpendicular to the surface of the glass or in the least preferable orientation with respect to the glass surface. The present invention promotes random crystalline orientation development which increases substantially the number of crystals in a preferred orientation with respect to the glass surface.

To obtain improved strengths which will not be unduly lowered through the abrasion resulting from ordinary handling of the glass surface, the crystalline growth must extend a certain minimum distance into the glass. To obtain this necessary minimum depth of crystallization using the known technique produces a relatively large crystal size which promotes excess scattering of incident light to impair the transparency of the glass. The known method requires a relatively high temperature or a relatively long period of time at a lower temperature to produce the desired crystalline growth and so tends to be impractical for commercial large-scale operations. Glasses which must be melted and formed at relatively high temperatures are not suitable for use in conventional forming equipment.

INVENTION

Broadly, the present invention is an improved method of strengthening glass articles by controlled surface and near surface random crystallization. The invention is more particularly a method of developing randomly oriented silica-O crystals on selected crystal nuclei in and near the surface of a glass article utilizing a gradient thermal heat treatment.

Silica-O is the name given to a type of crystalline structure which is a polymorphic form of $SiO_2$. A discussion of the nature of the silica-O crystal form can be found in Zeitschrift fur Kristallographie, vol. III, pp. 185–189 (1959) by Rustum Roy. This form of $SiO_2$ exhibits a structure which is very similar to that of high quartz. The silica-O crystalline structure is metastable at room temperature but occurs commonly at this temperature.

The silica-O crystalline structure can be easily and conclusively identified by its powder diffraction pattern. Silica-O can be distinguished from other polymorphic forms of $SiO_2$ by the absence of $d$ spacings in the silica-O crystal at about 3.85 angstroms and 3.17 angstroms. Table I presents powder X-ray data for the end numbers of the silica-O series.

TABLE I

| hkl [1] | $SiO_2$ richest in high-quartz d spacings in angstroms | $I/I_o$ relative reflected intensity | β-Eucryptite d spacings in angstroms | $I/I_o$ $SiO_2$ most deficient, relative reflected intensity |
|---|---|---|---|---|
| 100 | 4.32 | 40 | 4.55 | 22 |
| 101 | 3.38 | 100 | 3.53 | 100 |
| 110 | 2.498 | 10 | 2.624 | 10 |
| 102 | 2.303 | 5 | 2.384 | 3 |
| 200 | 2.165 | 18 | 2.274 | 9 |
| 201 | 2.013 | 12 | 2.105 | 8 |
| 112 | 1.842 | 60 | 1.914 | 38 |
| 202 | 1.606 | 3 | 1.763 | 3 |
| 211 | 1.568 | 25 | 1.643 | 24 |
| 212 | 1.404 | 20 | 1.463 | 11 |
| 203 | 1.393 | 35 | 1.441 | 16 |

[1] Based on simple quartz cell, without doubling of C axis found in β-eucryptite itself.

In the above table, the $hkl$ integer notation defines a plane in the crystal structure to which the rest of the tabulated data refers. The $d$ spacing data in angstroms represents the distance between the parallel crystalline planes of the type described by the $hkl$ notation.

$I/I_o$ represents the relative intensity of the reflected, essentially monochromatic X-ray light beam used to analyze the crystal for each series of crystalline planes for which a $d$ spacing is determined. The crystal plane for which the maximum intensity of reflected radiation occurs is taken arbitrarily to be 100 percent and all other planes have their relative reflected intensity described as a percentage of the most highly reflecting crystalline plane. I denotes the intensity of the reflected radiation of the plane being investigated and $I_o$ denotes the arbitrary reflectivity standard of 100 percent.

In the present invention, randomly-oriented silica-O crystals are selectively grown on crystal nuclei in and near the surface of glass articles principally formulated from a family of lithia-alumina-silica base glass compositions.

The silica-O crystal exhibits a low coefficient of thermal expansion compared to the coefficient of thermal expansion exhibited by the base glass. The surface regions of glass articles treated in accordance with the present invention (regions of high percent crystallinity) are placed in a state of high compressive stress upon cooling, due to the difference in the coefficients of thermal expansion of the silica-O crystal and the base glass.

The refractive index of silica-O has been determined to be about 1.53, but this measurement may be in error because the measured refractive index is affected by solid solution, and in the test samples the crystals being analyzed exist in a solid solution of glass. Determination of the index of refraction is further complicated by the extremely small size of the crystals being analyzed.

The present method of producing strengthened glass articles begins with fabricating the article to be strengthened into its final desired configuration by conventional glass making and glass forming techniques. Crystal nuclei are then developed throughout the entire thickness of the glass article through thermal treatments in which the glass article is heated to the optimum nucleating temperature for the particular glass composition being used. Titanium added to the base glass composition in the form of $TiO_2$ is preferred as the metallic ion which exhibits good nucleating properties in the glass compositions described in this specification. Although $TiO_2$ is preferred as the nucleating agent, any other materials that possess the ability to produce nuclei in the base glass composition upon which silica-O crystals may ultimately be developed may also be utilized.

After the crystal nuclei have been formed throughout the glass article, a subsequent heat treatment at a higher temperature allows only the nuclei at and near the surface of the glass to grow into crystals, leaving the nuclei previously formed in the interior of the glass article undeveloped. The method used to select and control which nuclei to develop into crystals and which not to develop into crystals consists of establishing a controlled thermal gradient through the glass. The parts of the glass article which are heated closest to the temperature at which maximum crystalline growth occurs for the particular glass composition being treated develop the highest percentage of crystalline growth. The zones of the glass in which crystallization is sought to be avoided or in which the amount of crystallization is sought to be reduced are kept below the temperature at which substantial crystalline growth proceeds.

As described hereinafter in the examples, a thermal gradient may be maintained in a glass article by heating one side of the article while cooling the other side, for example, by utilizing a material such as carbon as a heat sink to promote cooling. Commercial techniques for maintaining a thermal gradient across a glass article, especially a flat glass sheet, comprise heating one side of the sheet with a fluid while substantially simultaneously cooling the other side of the sheet with a fluid. Appropriate fluids for this purpose may be liquids or gases. Gases may be utilized by independently supporting the sheet by structural means while contacting one side of the sheet with a hot gas, such as air, while contacting the other side of the sheet with a cooler gas, for example, air, so as to maintain a thermal gradient across the glass sheet so that only the surface portions of the glass being contacted by the hot gas will undergo crystallization. Also, of course, the glass may be supported on gas in accordance with the teachings of U.S. Patent 3,322,501 and contacted on the upper side with a gas of a different temperature, for example, the gas supporting the glass sheet could be a hot gas while the gas contacting the upper portion of the glass sheet could be a cooler gas. The difference in temperature between the hot gas and the cooler gas should not be so great as to cause thermal fracture of the glass although this would not be a severe problem since at least a substantial portion of the glass will be above the strain point of the glass.

Another commercial technique appropriate for maintaining a thermal gradient across a glass sheet comprises floating the glass sheet on a fused salt or molten metal bath while exposing the upper surface of the glass to ambient temperatures. In such an operation, the upper portions of the glass sheet could be purposely contacted with a cool gas in order to insure that only the surface portions of the glass in contact with the hot liquid will undergo crystallization. Appropriate liquids for this purpose are fused salts and molten metals; for example, fused alkali metal salts such as sodium chloride, sodium nitrate, potassium sulfate, and the like, and molten metals such as tin, lead, and the like. These techniques represent known commercial means for maintaining a thermal gradient across the cross-section of a glass sheet.

Glass articles strengthened in accordance with the controlled crystallization techniques of the present invention exhibit certain desirable characteristics over articles prepared utilizing other crystallization strengthening techniques. The crystals developed utilizing the present invention's techniques are characteristically randomly oriented with respect to the surface of the glass article as opposed to the unidirectional orientation adopted with respect to the surface of the glass article treated in accordance with some of the known crystallization techniques. A comparison of the randomly-oriented crystalline structure that is produced using the teachings of the present invention with the unidirectional crystalline growth exhibited by surface nucleated techniques can be seen in the attached photographs (FIGURES 1 and 2).

Figure 2:
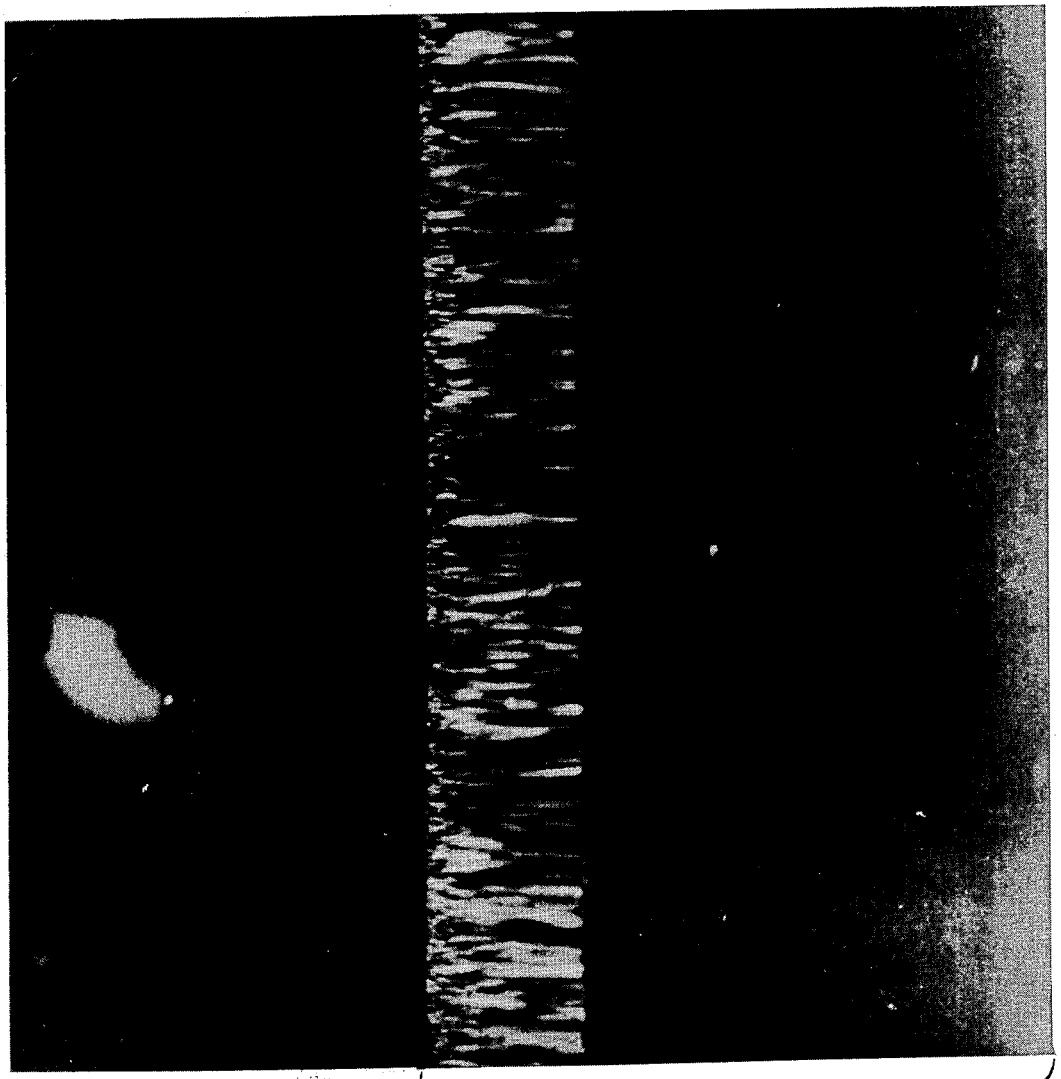

FIGURE 1 is a photograph magnified 40× and then enlarged to 80× of the randomly-oriented silica-O crystals produced in and near the surface of a glass article treated in accordance with the present invention. FIGURE 2 is a photograph magnified 80× of the needle-shaped crystals which are characteristically formed when crystalline growth is developed from surface nucleation sites as developed by a prior art method. The location of the surface and interior portion of each glass sample is indicated on each photograph to facilitate comparison of the two types of crystalline layers developed.

Random crystalline orientation results in higher compressive stress being developed in the surface of the glass article parallel to the surface than develops when unidirectional crystal orientation perpendicular to the glass surface is produced. This is because a higher percentage of the crystals in the random distribution orient themselves in a direction more nearly parallel with the surface of the glass more frequently lining up the axis of the silica-O crystal that exhibits the highest negative coefficient of thermal expansion (C axis) with the surface of the glass.

The number of individual crystals produced by this method also increases and correspondingly their average size decreases as orientation becomes more random. The size of the crystals produced in accordance with the present invention generally varies from approximately 0.1 micron to 0.5 micron in size. This result is obtained also as a direct result of the crystalline growth not being limited to growth upon the crystal nuclei that occur only at the very surface of the glass. Crystalline growth is promoted upon the previously established crystal nuclei in all of the areas in which the crystalline growth temperature is attained. The increased number of nuclei which are allowed to grow into crystals limits the size to which each crystal can grow before contacting another crystal growinng in the same immediate area of the glass. The earlier the crystals thus developed contact each other, the smaller becomes the average size of each crystal. The large number of small crystals that are developed in the surface of the glass article results in the production of glass articles that exhibit increased modulus of rupture strengths without substantially decreasing their transparency. The transparency retained, coupled with the increased mechanical strength developed through this surface and near surface crystallization process constitute a desirable advance in the properties which can be incorporated into glass products manufactured for commercial uses.

Another characteristic of the present invention is that the establishment of a controlled thermal gradient in the glass article promotes a corresponding percent crystallinity gradient to develop in the glass article being treated. The percent crystallinity developed can be as high as 100 percent at the surface of the glass article, and will gradually decrease as penetration is made into the glass article until the composition becomes 100 percent noncrystalline (glass phase). The depth of crystalline penetration or development into the glass is dependent upon the duration of the heat treatment and the temperatures developed in the glass during the crystallization heat treatment, which factors can, of course, be varied to produce varying degrees of depths of crystallization and percent crystallinity.

The present invention also allows for the production of strengthened glass articles in a shorter period of time and at lower temperatures than is presently taught in the art.

The invention is further described in the following detailed examples: The embodiment of Example IV is contemplated by the inventor to be the best mode of carrying out the invention.

Example I

An embodiment of the present invention consists of making a glass from the following oxide batch composition:

| Component: | Percent by weight |
|---|---|
| $SiO_2$ | 57.58 |
| $Al_2O_3$ | 28.18 |
| $MgO$ | 3.90 |
| $Li_2O$ | 5.35 |
| $TiO_2$ | 5.00 |

The glass produced by this batch composition has an optimum nucleation temperature of 718° C., and an optimum crystallization temperature of 872° C. The optimum nucleation temperature is defined to be the temperature at which the viscosity of the glass being nucleated allows nucleating materials such as $TiO_2$ in the glass to coagulate in masses somewhat smaller than 700 angstroms in size, in a reasonably short time, for example, 30 minutes. The optimum crystallization temperature is defined to be the temperature at which crystallization will occur in a reasonably short time, for example, 10 to 15 minutes.

Glass articles are prepared from the aforementioned glass composition by weighing out and mixing a 600 gram batch of the oxide composition listed. The raw materials are placed in a clay crucible and heated to 1500° C. in a furnace. The glass is allowed to fine overnight at this temperature and then it is quenched by pouring the melt into cold water. The cullet which is thus produced is remelted in a platinum crucible at 1500° C. for 1 hour. The glass is then mechanically stirred for 2 hours and allowed to fine another hour at 1475° C.

At this time strip samples are prepared, 1 inch by 2 inches by ¼ inch by pouring the molten glass into graphite molds preheated to 600 ° C. The molds containing the glass samples are then allowed to cool to room temperature overnight in an oven previously heated to 550° C. which has been turned off. The strip samples are then cut to produce ¼ inch cube samples. These samples of ¼ inch glass cubes are heated in an electric oven to a temperature of 718° C. for approximately 15 minutes to nucleate the sample. The nucleated sample is then ready to be heated to develop crystals selectively in the regions of the glass sample heated to the crystallization temperature.

A thermal gradient is established in the glass sample during the crystallization heat treatment by placing the top surface of the glass cube in contact with a resistance heated platinum strip and placing a spring supported carbon block, which serves both as a supporting device and as a heat sink, on the bottom side of the glass cube. A heat sink or cooling member is used in this example to insure that a temperature gradient through the thickness of the sample is achieved. Such a cooling member is not required when the sample being treated is relatively thick, but it helps maintain the thermal gradient when a relatively thin glass specimen is being treated. The heat sink prevents the rapid establishment of a temperature equilibrium which destroys the necessary thermal gradient.

The temperature of the platinum strip in contact with the glass sample is then instantly increased to 872° C. and maintained at that temperature for approximately 30 minutes to maximize crystalline growth in and near the surface of the glass. The resistance furnace is then turned off and the platinum strip cools almost immediately.

This treatment results in a crystalline layer developing in the glass sample approximately 1 millimeter thick on the side of the glass cube in contact with the platinum strip. Microscopic examination of the treated sample under a polarizing microscopic (crossed nicols) indicates that the surface and subsurface are almost 100 percent crystalline and, after one millimeter's penetration, the sample is found to be 100 percent glass.

Example II

Another embodiment of the present invention comprises preparing specimens of the composition described in Example I by pouring the molten glass into carbon molds preheated to 600° C. to form bars of glass approximately 1 inch by 1 inch by 2½ inches. After the bars have cooled to about 550° C. by standing in air at room temperature about 2 minutes, they are removed from the mold and placed in an oven at 550° C. where they are allowed to cool slowly to room temperature over a period of 9 hours.

Nucleation of the base glass is accomplished by heating the glass bars to the nucleation temperature of 718° C. and maintaining them at this temperature for approximately 30 minutes. After nucleation, the bars are again allowed to cool to room temperature over a period of 12 hours by placing them in an oven preheated to 550° C. which has been turned off. To prevent the possibility of breakage due to thermal shock during subsequent heat treatments, the bars are then placed in a molten tin bath at a temperature of 550° C. for approximately 15 minutes to establish a uniform temperature throughout the thickness of the bar. The procedure of holding the bar at a uniform temperature above the annealing point of the particular glass composition removes any residual stress which may be present in the glass specimen.

The bars are then removed from the temperature equalization treatment and subjected to a controlled temperature gradient profile through the thickness of the bar. This is accomplished by totally immersing the glass bar in a molten tin bath maintained at a temperature of 872° C. for a period of from 1 to 12 minutes to produce the desired depth of surface crystallization. The depth of crystallization and the percent crystallinity in and near the surface of the glass is a function of the immersion time and temperature.

After the desired degree of crystallization has been realized, the bars are removed from the crystallization treatment bath and re-immersed in the temperature equilibrium bath until a uniform temperature again is established throughout the thickness of the bar. The temperature equalization treatment requires a time equivalent to or slightly longer than the time spent in developing crystallization (1 to 12 minutes). The bars are removed from the temperature equalization bath and placed in an oven at 550° C. The glass bars are then allowed to cool to room temperature over a period of approximately 9 hours in the same manner used to cool the samples subjected to the nucleation heat treatment.

Bars treated according to this procedure exhibit crystallization to various depths depending on the immersion time and the temperatures attained in various portions of the sample during the crystallization heat treatment. The percent crystallinity is also found to depend upon the immersion time and the temperatures attained in the sample.

Table II lists the crystallization time and temperature treatment schedules for several samples and the depths to which crystalline matter was determined to be present.

TABLE II.—CRYSTALLIZATION TREATMENT

| Sample No. | Temperature of molten tin (° C.) | Period of immersion (minutes) | Depth of surface crystallized layer (inches) |
|---|---|---|---|
| 1 | 811 | 4 | 0 |
| 2 | 820 | 4 | 0 |
| 3 | 825 | 12 | 0.2 |
| 4 | 835 | 4 | 0.1 |
| 5 | 835 | 6 | 0.2 |
| 6 | 835 | 8 | 0.1 |
| 7 | 840 | 4 | (¹) |
| 8 | 888 | 1 | 0.4 |

¹ Sample completely crystallized.

Measurements were also made of the density of the crystallized matter. These values are expressed in Table III as percent crystallization per ⅒ of an inch layer of the glass sample.

TABLE III

| Sample No. | Crystallization treatment | | | Percent crystallization per 0.1 inch layer | | | |
|---|---|---|---|---|---|---|---|
| | Temperature (° C.) | Period (minutes) | Total depth (inches) | 1st | 2nd | 3rd | 4th |
| 3 | 825 | 12 | 0.2 | 10 | 4 | | |
| 4 | 835 | 4 | 0.1 | 4-6 | | | |
| 6 | 835 | 8 | 0.4 | 85 | 82 | 71 | 70 |
| 8 | 888 | 1 | 0.1 | 3 | | | |

Example III

Another illustrative example comprises preparing glass rods ⅜ inch in diameter by 3 inches long formed from the same glass composition described in Example I. These glass rods are nucleated by heating the samples for a period of 15 minutes at a temperature of 718° C. in the manner described in Example II. The crystallization is developed by immersing the samples in the molten tin bath used in preparing the samples described in Example II. The time of immersion in the molten tin bath is 1 minute at a temperature of 872° C. Rods identical to the rods nucleated and crystallized in accordance with the above procedure were retained as control samples to determine how much improvement in the modulus of rupture was actually obtained utilizing the teachings of the present invention. Glass rods crystallized in accordance with the above procedure were found to have a modulus of rupture of 53,600 pounds per square inch. The control samples tested in the same way were found to have a modulus of rupture of only 15,040 pounds per square inch, indicating at least a 300 percent increase. Experiments indicate that careful control of the present invention can result in glass samples having a modulus of rupture in the vicinity of 100,000 pounds per square inch.

The modulus of rupture test used to measure these samples consists of positioning the rod to be tested on top of two point supports and then subjecting the thus positioned rod to pressure applied at a point midway between the two point supports and on the top surface of the rod until the rod fractures. The breaking stress was calculated using the formula:

$$\text{Stress} = \frac{WL}{2\pi C^3}$$

where W equals the load in pounds, L equals the effective span (2.5 inches) and C equals the radius of the rod in inches.

Example IV

Another embodiment of the present invention is to prepare sample discs ¼ inch thick by 2 inches in diameter of the same base glass composition described in Example I. These samples are prepared by pouring the molten glass into the proper size preheated carbon molds and allowing them to cool to room temperature over a period of about 9 hours. The samples are then nucleated in accordance with the description given in Example I by heating them in an oven for 30 minutes at 718° C. The samples are then removed from the oven and allowed to cool for about 5 minutes to a temperature of 550° C. at which time they are immersed in a molten tin bath kept at 550° C.

Silica-O crystallization is developed by immersing each of the samples in a tin bath in the same manner described in promoting crystalline growth in Example II. Total immersion times were determined by using a series of 15-second immersions at 875° C. in molten tin. After each 15-second immersion, the samples were cooled to 550° C. to stop crystalline development by immersing the samples in a molten tin bath at 550° C. for 4 minutes. Alternate multiple 15-second immersions were used instead of one prolonged immersion time to insure that a steep thermal gradient would exist in the glass specimen during the high temperature crystallization heat treating step.

Figure 3:
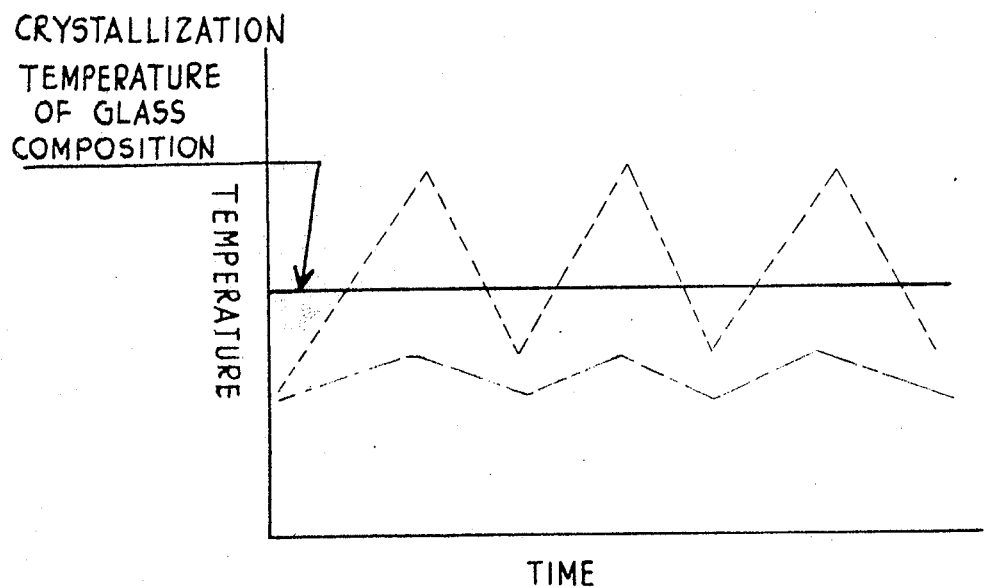

FIGURE 3 represents graphically the process of intermittent heating to obtain crystallization in the surface portions only of a glass article. The intermittent heating results in surface portions of the article being alternately raised above the crystallization temperature of the glass composition while the interior portions of the article are maintained at temperatures below the crystallization temperature of the glass composition. The intermittent heating, followed preferably by cooling to a selected temperature below the crystallization temperature, is conducted after nucleation sites have been developed throughout the whole glass body. The nucleation procedure has been explained hereinabove. No particular temperatures or times have been assigned to FIGURE 3 inasmuch as it is intended to represent generally the process of this invention. It is instructive of the inventive process inasmuch as the crystallization temperature is indicated relatively on the figure. For example, the crystallization temperature of the glass composition utilized in Example IV is 872° C.

This procedure restricts the thickness of the crystalline layer developed and also increases the percent crystallinity which occurs at the surface of the glass. In the samples thus prepared, crystallization occurs to a depth of approximately 1 millimeter or about 10 percent of the total thickness of the ¼ inch thick samples. After the final cooling immersion to 550° C. for each sample is conducted, the sample is annealed by placing it in an oven at 550° C. with the oven turned off and allowed to cool overnight. The cooling down to room temperature in this manner is allowed to take place over about a 14-hour time interval.

The surface crystallized samples were then analyzed and tested to determine the size of the silica-O crystals produced on the surface, to measure the center tension which developed in the samples' interior and to determine the modulus of rupture of the various specimens using a concentric ring loading test. Table IV indicates the relationships found between strengths exhibited by the samples and the crystalline sizes developed for various immersion times among the samples.

TABLE IV

| Specimen No. | Immersion time, 15 seconds per dip | Average size of surface silica-O crystal developed (micron) | Center stress, mu/inch | Modulus of rupture lbs./sq. in |
|---|---|---|---|---|
| 1 | 45 (3 x 15) | 0.2 | 3,770 | 16,890 |
| 2 | 75 (5 x 15) | 0.3 | 1,535 | 23,540 |
| 3 | 105 (7 x 15) | 0.4 | 2,910 | 28,830 |
| 4 | 195 (13 x 15) | 0.4 | 5,900 | 23,280 |

The mu/inch measurement in Table IV is related to the amount of stress which exists in the glass sample. A linear measurement is made of how much retardation occurs in a polarized beam of light passing through the stressed glass sample. The retardation is measured in millimicrons. This measurement in millimicrons is then divided by the thickness of the glass sample in inches, and the result is reported in mu/inch units. This stress measurement can be used to predict the modulus of rupture and the average size of the glass fragments which will be produced when the glass sample is shattered.

The concentric load ring test consists of supporting the 2-inch diameter crystallized glass disc to be tested on a 1¾ inch steel ring above which a ¾ inch steel ring is placed to contact the center of the specimen. The load is applied by lowering the ¾ inch ring, and the modulus of rupture is calculated using the following formula:

$$S = \frac{.625W}{T^2}$$

where S equals the modulus of rupture in pounds per square inch, W equals the load which causes fracture, and T equals the thickness of the specimen in inches.

It is characteristic of the present invention that crystallization occurs near and at the surface of the glass, while leaving the interior of the glass article substantially unchanged. The transparency of the glass article remains substantially the same because the crystals produced are very small and the crystals developed have an index of refraction very close to that of the base glass.

The compressive stress which develops in the glass surface is the result of the silica-O crystal exhibiting a coefficient of thermal expansion when randomly oriented of zero. The negative coefficient of thermal expansion along the silica-O C axis approximately compensates for the positive coefficients of thermal expansion along the other two axes, resulting in a net zero expansion coefficient exhibited by the randomly-oriented crystalline mass. Since the base glass exhibits a positive coefficient of thermal expansion, this differential develops a compressive stress in the glass article's surface upon cooling of the article.

Although the examples presented are restricted to the glass composition noted in Example I, other compositions produce glasses which can be strengthened through crystallization according to the present invention. A desirable consideration is that the glass composition be able to develop the form of crystal known as silica-O. Silica-O can be precipitated from a wide variety of compositions in the lithium-alumina-silica system.

A family of surface crystallizable base glasses of the lithia, alumina, magnesia, silica group to which $P_2O_5$ has been added can be used. Compositions in this system have the added advantage of possessing viscosity liquidus temperature relationships which make them suitable for drawing or otherwise forming into flat glass products. This family of glasses has compositions of 3 to 9 percent by weight of $Li_2O$, 17 to 35 percent by weight of $Al_2O_3$, 2 to 6 percent by weight of MgO, 54 to 65 percent by weight of $SiO_2$, 1 to 11 percent by weight of $P_2O_5$ and 2 to 10 percent by weight of $TiO_2$. Examples of this family of glasses are disclosed in a co-pending application of Dale W. Rinehart, Ser. No. 324,496, filed Nov. 21, 1963.

The addition of $P_2O_5$ in such glass batches raises the viscosity of the glass at the liquidus temperature by simultaneously lowering the liquidus temperature and raising the viscosity level of the glass. It has been noted that in glasses which contain $P_2O_5$, the aluminum content must be of a certain level to prevent hazing of the glass upon cooling. The addition of 5 percent by weight $P_2O_5$ to a composition containing 29.66 percent by weight $Al_2O_3$ produces no haze on the resulting glass. However, if the $Al_2O_3$ content is reduced to 15.59 weight percent, the glass becomes hazy upon cooling. Additional $Li_2O$ or other alkali metal oxide intensifies the haze which tends to appear on the glasses. $B_2O_3$ and $Na_2O$ can be added in small amounts up to about 3.5 percent by weight to serve as an aid in melting. Any further addition causes reduction in the liquidus temperature but does not appreciably raise the viscosity at the liquidus temperature.

To this family of base glasses is added, as the nucleating agent, titanium in the form of $TiO_2$ from 2 to 10 percent by weight.

There are other crystallizable base glasses which can be formulated to practice the teachings of the present invention. Of these, crystallizable base glasses which contain 54 to 65 weight percent $SiO_2$, 17 to 35 weight percent $Al_2O_3$, 3 to 9 weight percent $Li_2O$, 2 to 6 weight percent MgO, and 2 to 11 weight percent $Na_2O$ and/or $K_2O$, the total weight percent of $Na_2O$ and $K_2O$ being no more than about 11 weight percent when both $Na_2O$ and $K_2O$ are present, can also be utilized. The $Na_2O$ and $K_2O$ are used to lower the viscosity of the glass composition at the usual glass forming temperatures. Typical examples of such glasses are also shown in the co-pending application of Dale W. Rinehart, Ser. No. 324,496, filed Nov. 21, 1963.

In general, the base glasses can contain as the essential ingredients 52 to 72 percent by weight $SiO_2$, 17 to 40 percent by weight $Al_2O_3$, 3 to 12 percent by weight of $Li_2O$, and 2 to 10 percent $TiO_2$ as the nucleating agent. The weight ratio of $Li_2O$ to $Al_2O_3$ in the glass composition should not be greater than about 0.3 to 1.

Small amounts of a fining agent such as $As_2O_3$ can be employed to aid in fining the batch. The $As_2O_3$ is omitted in the above listing of components and ingredients for convenience because the residual amount normally remaining in the glass after fining is too small to have any effect on its fundamental properties.

The batch materials for the above glass compositions may comprise any materials, either oxides or other compounds, which upon being fused are converted to the desired oxide composition in the desired proportions. Although it is immaterial whether the batch contains oxidizing or reducing agents, it is preferred, though not required, that the glass batch be prepared under slightly oxidizing conditions.

Other compatible metal oxides may also be present provided that their total amount does not exceed about 15 percent by weight and that they do not alter the refractive index of the glass to such an extent that it does not properly match with the refractive index of the silica-O crystal. This is necessary to prevent impairing the transparency of the strengthened article once the crystals are developed in the glassy matrix. Compatible metal oxides include the oxides of the metals of the second periodic group PbO, $B_2O_3$, $Na_2O$ and $K_2O$.

Materials composed of the oxides listed, such as β-spodumene ($Li_2O \cdot Al_2O_3 \cdot 4SiO_2$) and petalite $$Li_2O \cdot Al_2O_3 \cdot 8SiO_2$$

have upon being heated developed the silica-O crystalline structure.

Glasses in the lithium-silica system will like-wise crystallize silica-O if devitrified at very low temperatures, and it should be noted that this crystalline structure has been identified in commercial cellular glass containing little or no lithium and is by no means restricted to systems containing lithium.

Although only contact with platinum metal filaments and molten tin baths have been utilized to establish the thermal gradient necessary to prepare this type of glass, the invention should not be limited to these methods of providing the thermal gradient. Any mechanism that has the ability to rapidly transfer heat to the surface of the glass to be crystallized and which can maintain the necessary temperature for a sufficient period of time will be suitable. Control of these two variables will provide the necessary growth period and temperature to develop the silica-O crystals in and near the surface of the glass. Metal baths such as the molten tin bath are preferred because of their ability to transfer heat very rapidly to the surface of the glass.

The present invention is an improvement over crystallization techniques in which the nucleating agent (titanium) is applied to the surface of the glass, in that the crystals which result from such a surface application grow from the surface in a direction perpendicular to the surface of the glass. This produces crystals that have their C axis lying in the most undesirable plane to provide the desired compressive stress in the glass surface. By having growth from nucleation sites in the glass as well as from the surface, the result is a desirable random orientation of low index of refraction crystals developing not only at the surface, but from various locations in the body of the article near its surface. The random orientation of the crystals results in a greater percentage of the crystals adopting an orientation more nearly parallel with respect to the glass surface, which improves the amount of compressive stress which can be introduced into the surface per percent crystallinity developed in the glass surface.

The present invention can be utilized to produce crystallization in a relatively wide band of glass thicknesses formulated from the base glass compositions indicated. The degree to which crystallization can be produced in the glass article is a function of how long the glass is maintained at the crystallization temperature and the steepness of the thermal gradient established in the glass piece. The higher the percent crystallinity desired in and near the surface of the glass, the longer must the glass surface be kept at its crystallization temperature. The greater the thickness of the crystalline growth desired, the more must the thermal gradient established in the glass be reduced in severity, allowing a greater percentage of the glass to attain the necessary temperature to promote crystalline growth.

I claim:
1. In the method of forming transparent, strengthened glass articles having a major outer surface, said glass being of a glass composition of the lithia-alumina-silica family which forms silica-O crystals having a lower coefficient of thermal expansion than said glass by subjecting a region at and near the major surface of said article to elevated temperatures sufficient to devitrify said region partially and to develop randomly-oriented silica-O crystals in said region at and near the major surface of said glass article and by subsequent cooling of said partially devitrified articles to place the surface portions of said articles containing said crystals in compression, the improvement which comprises:
 (A) heating to a nucleating temperature a glass having a sufficient quantity of an internal nucleating agent therein to promote whole-body nucleation,
 (B) holding said glass at its nucleation temperature for a sufficient period of time to develop nuclei throughout the whole glass body,
 (C) heating a major surface of said glass article at the crystallization temperature of said glass for a sufficient period of time to develop randomly-oriented silica-O crystals in a region at and near the major surface of said article, a high percentage of said crystals being oriented in a direction nearly parallel with said major surface of said glass article,
 (D) maintaining the temperature of the interior portion of said glass article below the region thereof in which said crystals develop at a temperature below that at which substantial crystalline growth proceeds, and
 (E) cooling said glass article until the region at and near the major surface of said article which contains said silica-O crystals is in compression and said interior portion of said article below said crystalline region is in tension,
whereby a transparent, strengthened glass article is provided wherein a region at and near a major surface thereof which region contains randomly-oriented silica-O particles is in compression and an interior portion of said article below said crystalline region is substantially free of crystalline growth and is in tension.

2. The method of claim 1 wherein the thermal gradient is maintained by substantially simultaneously heating one surface of a glass sheet while cooling the opposite surface of said sheet, said heated surface being at the crystallization temperature of the glass.

3. The method of claim 2 wherein the heating and cooling is accomplished by a hot fluid and a cooler fluid.

4. The method of claim 1 wherein the surface portion of the glass undergoing crystallization is maintained above a temperature of about 872° C.

5. The method of claim 1 wherein the thermal gradient is maintained by intermittent heating of the glass surface.

6. The method of claim 5 wherein the intermittent heating of the glass surface is obtained by intermittent insertion of a glass article in a molten liquid bath maintained at a temperature above the temperature at which substantial crystalline growth proceeds in said glass article.

7. In the method of forming transparent, strengthened glass articles having a major outer surface, said glass being of a glass composition of the lithia-alumina-silica family which forms silica-O crystals having a lower coefficient of thermal expansion than said glass by subjecting a region at and near the major surface of said article to elevated temperatures sufficient to devitrify said region partially and to develop randomly-oriented silica-O crystals in said region at and near the major surface of said glass article and by subsequent cooling of said partially devitrified articles to place the surface portions of said articles containing said crystals in compression, the improvement which comprises:
 (A) heating to a nucleating temperature a glass having a sufficient quantity of an internal nucleating agent therein to promote whole-body nucleation,
 (B) holding said glass at its nucleation temperature for a sufficient period of time to develop nuclei throughout the whole glass body,
 (C) subsequently heating said nucleated glass by intermittent, periodic application of heat at the major surface of said glass to raise only the region at and near the major surface to its crystallization temperature for a period of time sufficient to develop randomly-oriented silica-O crystals containing a high percentage of crystals oriented in a direction nearly parallel with said major surface in said region at and near said major surface of said article,
 (D) maintaining the temperature of the interior portion of said glass article below the region thereof in which said crystals develop at a temperature below that at which substantial crystalline growth proceeds, and
 (E) cooling said glass article until the region at and near the major surface of the article which contains said silica-O crystals is in compression and said interior portion of said article below said crystalline region is in tension,
whereby a transparent, strengthened glass article is provided wherein a region at and near a major surface thereof which region contains randomly-oriented silica-O particles is in compression and an interior portion of said article below said crystalline region is substantially free of crystalline growth and is in tension.

8. The method of claim 7 wherein the glass article is of a composition comprising lithia, alumina, magnesia, silica, and titania.

9. The method of claim 7 wherein the glass article is of a composition consisting essentially in percent by weight of 54 to 65 percent $SiO_2$, 17 to 35 percent $Al_2O_3$, 3 to 9 percent $Li_2O$, 2 to 6 percent $MgO$, 2 to 10 percent $TiO_2$, and a viscosity-controlling agent selected from the group consisting of 2 to 11 percent $Na_2O$, 2 to 11 percent $K_2O$, mixtures of $Na_2O$ and $K_2O$ not exceeding about 11 percent, 1 to 11 percent $P_2O_5$, and mixtures of $Na_2O$ and $P_2O_5$, $K_2O$ and $P_2O_5$, and $Na_2O$, $K_2O$, and $P_2O_5$ in the stated amount not exceeding about 12 percent.

10. The method of claim 7 wherein the nucleation occurs by heating said glass above about 718° C. and the crystallization occurs by heating said glass above about 872° C.

References Cited
UNITED STATES PATENTS

| | | | |
|---|---|---|---|
| 3,113,877 | 12/1963 | Janakiramarao | 65—33 |
| 3,282,770 | 11/1966 | Stookey et al. | 65—33 |
| 3,253,975 | 5/1966 | Olcott et al. | 65—33 X |
| 3,218,141 | 11/1965 | Lambert | 65—182 XR |
| 3,206,292 | 9/1965 | Pilkington et al. | 65—182 XR |
| 3,266,912 | 8/1966 | Murphy | 65—33 XR |

(Other references on following page)

OTHER REFERENCES

"Glass Technology," volume 4, No. 6, December 1963, entitled "Solid State Crystallization Processes in Selected Glass Ceramic Materials" by Williams and Carrier, pp. 183 to 190.

"Journal of American Ceramic Society," No. 1, Jan. 21, 1964, pp. 25 to 29, vol. 47, entitled "Surface Nucleation and Crystal Orientation in Lithium Silicate Glass Fibers," by Booth and Rindone.

J. American Ceramic Society, July 1962, vol. 45, No. 7, pp. 324 to 325, "Infrared Study of Compounds and Solid Solutions in the System Lithia-Alumina-Silica," by Murthy and Kirby.

S. LEON BASHORE, Primary Examiner

F. W. MIGA, Assistant Examiner

U.S. Cl. X.R.

65—30, 60; 106—39